Patented Jan. 11, 1944

2,338,902

UNITED STATES PATENT OFFICE 2,338,902

PROCESS FOR MANUFACTURE OF ISOTHIOCYANATES

Jean Claudin, Paris, France; vested in the Alien Property Custodian

No Drawing. Application March 4, 1941, Serial No. 381,764. In France November 22, 1940

6 Claims. (Cl. 260—454)

When a cyanogen halide is caused to react at room temperature upon a dithiocarbamate, a symmetrical thiuram monosulphide is obtained. It is furthermore known that when the reaction is effected at a sufficiently low temperature, practically in the neighbourhood of 0° centigrade, an intermediate compound is formed according to the following reaction:

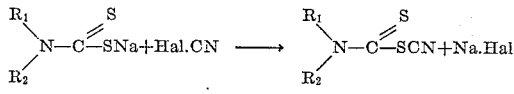

in which $R_1$ and $R_2$ are any organic radicals. Such compounds may be considered as mixed anhydrides of a dithiocarbamic acid and cyanic or thiocyanic acid. They can be condensed with a second molecule of a dithiocarbamate to thiuram monosulphides.

I have found that, when a dithiocarbamate derived from a primary amine is used as a starting material, the reaction follows another way.

It may indeed be assumed that a mixed anhydride is formed by action of a molecule of cyanogen halide upon a molecule of dithiocarbamate. But such anhydride is certainly less stable than those of the above indicated formula, for it is immediately splitted into the corresponding isothiocyanate and thiocyanic acid. The reactions proceed according to the following scheme:

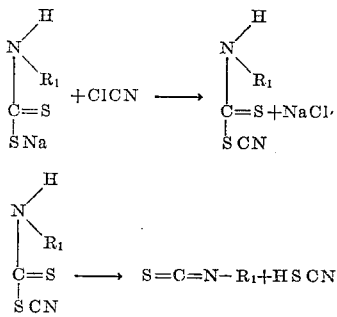

It will, therefore, be sufficient to introduce a cyanogen halide into a solution of a dithiocarbamate derived from a primary amine, until disappearance of the totality of the latter, in order to obtain isothiocyanate.

As the introduction of cyanogen halide proceeds there occurs a turbidness and the isothiocyanate progressively separates out while there is observed the presence of thiocyanic acid in increasing quantity. This reaction results in quantitative yields and in products of very good quality.

The following examples are given for the purpose of illustration, but not of limitation, in order to show how the invention may readily be carried into practical effect.

EXAMPLE I.—*Production of phenyl isothiocyanate*

93 grams of aniline are transformed into phenyl-dithiocarbamate according to any of the known processes by mixing aniline, water, carbon disulphide and an alkaline agent. The solution is filtered, whereafter cyanogen chloride is introduced. The aqueous liquid becomes turbid, then phenyl isothiocyanate separates out progressively, while formation of sulphocyanide is observed in the aqueous liquid. When all dithiocarbamate has disappeared (drop-tests with iron perchloride), the introduction of cyanogen chloride is stopped and the oil decanted and distilled. After one single distillation there are obtained 120 grams of phenyl isothiocyanate in pretty nearly pure state.

EXAMPLE II.—*Production of ortho-tolyl isothiocyanate*

By replacing aniline used in the preceding example with 107 grams of O.toluidine and by operating as above described there are obtained 140 grams of ortho-tolyl isothiocyanate.

EXAMPLE III.—*Production of α-naphthyl isothiocyanate*

By replacing aniline used in the Example I with 143 grams of α-naphthylamine there are obtained 150 grams of α-naphthyl isothiocyanate in crystalline state. By one single crystallisation in alcohol there are obtained fine characteristic needles melting at 57° centigrade.

EXAMPLE IV.—*Production of β-naphthyl isothiocyanate*

When cyanogen chloride is introduced into a solution of β-naphthyl dithiocarbamate there is obtained β-naphthyl isothiocyanate in gray flakes which, when recrystallized in alcohol, melt at 61° centigrade.

In all of the previous examples the introduction of cyanogen halide is stopped whenever it is observed that, by drop-test with ferric chloride, any brown colour due to dithiocarbamate has disappeared to leave but the characteristical red colour due to ferric thiocyanide.

It is to be understood that the present invention is not limited to the specific examples disclosed, and that changes may be made in the process described without departing from the scope of the invention as comprehended from the following claims.

What I claim is:

1. A method for the manufacture of an isothiocyanate, which comprises introducing a cyanogen halide into a solution of a dithiocarbamate derived from a primary amine.

2. A method for the manufacture of an aryl isothiocyanate, which comprises introducing a cyanogen halide into an aqueous solution of a N-mono-aryl dithiocarbamate.

3. A method for the manufacture of an aryl isothiocyanate which comprises passing gaseous cyanogen halide through an aqueous solution of a N-mono-aryl dithiocarbamate containing no water solubilizing group in the aryl radical, thereby precipitating a mono-aryl isothiocyanate, and separating the same from the aqueous solution.

4. A method of producing α-naphthyl isothiocyanate, which comprises passing gaseous cyanogen chloride through an aqueous solution of an N-α-naphthyl dithiocarbamate, thereby precipitating α-naphthyl isothiocyanate in crystalline form, and separating the said isothiocyanate from the aqueous solution.

5. A method of producing β-naphthyl isothiocyanate, which comprises passing cyanogen chloride through an aqueous solution of a N-β-naphthyl dithiocarbamate, thereby precipitating β-naphthyl isothiocyanate as grey flakes, and separating the latter from the aqueous solution.

6. A method of producing ortho-tolyl isothiocyanate, which comprises passing cyanogen chloride through an aqueous solution of a N-ortho-tolyl dithiocarbamate, thereby precipitating ortho-tolyl isothiocyanate as an oil, and decanting the oil from the aqueous solution.

JEAN CLAUDIN.